United States Patent [19]
Bumgardner et al.

[11] 4,273,997
[45] Jun. 16, 1981

[54] AUTOMATIC PASSBOOK READER/WRITER APPARATUS

[75] Inventors: Donald L. Bumgardner, South Lyon; James N. Schreiber, Livonia, both of Mich.

[73] Assignee: Burroughs Corporation, Detroit, Mich.

[21] Appl. No.: 63,422

[22] Filed: Aug. 3, 1979

[51] Int. Cl.³ .................. G06K 7/08; G06K 15/02; G11B 25/04
[52] U.S. Cl. .................................. 235/449; 235/432; 360/2
[58] Field of Search ............... 235/449, 450, 432, 379; 360/2

[56] References Cited
U.S. PATENT DOCUMENTS

| | | | |
|---|---|---|---|
| 3,953,887 | 4/1976 | Kobylarz et al. | 235/449 |
| 4,039,069 | 8/1977 | Kwan et al. | 235/449 |
| 4,087,680 | 5/1978 | Mack et al. | 235/449 |
| 4,151,564 | 4/1979 | Schreiber et al. | 235/449 |

Primary Examiner—Daryl W. Cook
Attorney, Agent, or Firm—Carl Fissell, Jr.; Delbert P. Warner; Charles E. Quarton

[57] ABSTRACT

A unitary, demountable, insertable modular magnetic transducer transport assembly for use with accounting records such as magnetically encoded bank account passbooks, magnetic striped ledger sheets and credit cards including self contained magnetic transducer transport for timing track and data pick-up mechanisms capable of being operably coupled to and forming part of an automatic data print out apparatus for on line data processing of accounting information.

11 Claims, 9 Drawing Figures

AUTOMATIC PASSBOOK READER/WRITER APPARATUS

BACKGROUND OF THE INVENTION

1. Field of the Invention

This invention pertains broadly to the field of document read/write devices and more particularly to bank account passbook-credit card read/write transducer transport apparatus.

2. Description of the Prior Art

Bank account passbook readers have been designed in a variety of structural configurations operable as readers or writers or as combination reader/writer mechanisms. Most, if not all, of such apparatus is designed and configured for a specific use and is incapable of configurational variation without extensive redesign. All such apparatus may be capable of reading from and/or writing upon a magnetizable stripe disposed for example on a credit card or on a bank account passbook, ledger card or journal sheet. However, once the machine format is fixed at the time of manufacture it cannot easily or simply be altered to accommodate other than a specific accounting record or function for which it was initially designed. Obviously the foregoing state of the art limits the manufacture to individually designed hardware for each application. This is costly both from a design standpoint as well as from a fabrication and service standpoint. Additionally, it limits the sales attractiveness from a customer point of view since a customer may wish to have a machine which has more than one designed function in which case unless the manufacturer sees fit to make a combination design the customer may be unable to obtain the piece of equipment which he needs for the precise work that he has in mind without purchasing an expensive multifunctional apparatus having more functions than are required for the end result desired.

SUMMARY OF THE INVENTION

The present invention is directed to a novel unitary demountable, insertable, magnetic read/write transport assembly for optional insertion into and use with a printing apparatus provided with a demountable, insertable cross bar gate and key slot linkage. The printing apparatus presently manufactured by the assignee of the subject invention employs a matrix pin printer for producing copies of data in varied printed format and is configured such that the same basic apparatus is capable of accommodating bank passbooks, pin feed journal rolls and/or combinations thereof without machine redesign. Such basic apparatus is adapted to incorporate the present invention as an optional assembly therein. Fabrication is simplified as is service and/or repair since the inventive structure is designed and fabricated as a modular subassembly which includes the electromagnetic transducer and timing track transport means disassociated from the basic printing apparatus but capable of being operably coupled thereto.

The present invention comprises a rigid, preformed, box-like member fabricated as by casting or molding from a dielectric high strength material having a demountable closure member attachable thereto as by bolts to form a modular enclosed assembly. Internal of the box-like assembly are disposed a pair of elongated parallel shafts, rods or rails fixed at opposite ends against rotation and supporting a multi-gap read/write information data transducer member for linear reciprocatory motion along the rails. A timing track data transducer mounted for co-linear movement together with the information data transducer along the rails of the box-like member is operably coupled to an elongated timing track data receiving member supported adjacent to the data transducer effective upon movement of the timing track transducer member to interrogate the data on the timing track in conjunction with the data being written upon or read from the material being processed. A drive motor mounted on an integral pedestal extending from one end of the box-like member is coupled to the transducer by means of a pair of cable members effective to move the transducers conjointly back and forth along the shafts or rails.

A printed wiring control panel is demountably secured to the box-like member for interconnecting the data and timing track transducers to the base printing apparatus and to an associated host data processor, if any, with which the present apparatus may be operably associated. Item or document pressure anvil means is automatically engageable with and disengageable from a passbook or other data containing member so as to force the portion of the passbook or other material which carries the magnetically encoded or stored information into surface contact with the read/write transducer for reading from or writing upon the data carrying or receiving media.

The present apparatus is housed within and is adapted to be demountably coupled to the operational mechanisms of a base printing apparatus, such for example, as that shown and described in U.S. Pat. No. 4,151,564 which is assigned to the same assignee as the subject invention.

The base printing apparatus includes a printing device which is movable normal to a throat opening formed between oppositely disposed, adjustable guide members located at the top of the machine. This arrangement permits the base assembly to be optionally modifiable to accommodate various intelligence bearing material, such for example, as bank account passbooks of varying sizes, journal sheets and rolls of varying widths as well as a split journal modification for certain banking-accounting uses. Obviously, these varying functional configurations require the magnetic transport assembly used therewith to be both laterally adjustable to accommodate the optional sizes and widths employed as well as to be continually engageable with the base drive assembly without the requirement for any user configurational modification. In addition, the base apparatus is self contained in so far as the document handling capability of the base drive means is concerned regardless of whether the magnetic transport assembly of the present invention is to be employed with the base apparatus or not as the user requires.

DETAILED DESCRIPTION OF THE PREFERRED EMBODIMENT

The base machine incorporating the present invention is adapted for a variety of customer uses including, but not limited to, printer readout from an associated host machine or apparatus, journal roll printing from associated keyboard apparatus, bank customer passbook printing, automatic passbook reader/writer data handling and various combinations of the foregoing.

The present embodiment contemplates an automatic passbook read/write capability on the part of the described apparatus. To provide this feature among others, an automatic read/write transducer transport assembly module is adapted to be incorporated into the passbook handling base apparatus, as will now be described in detail.

Figure 1:
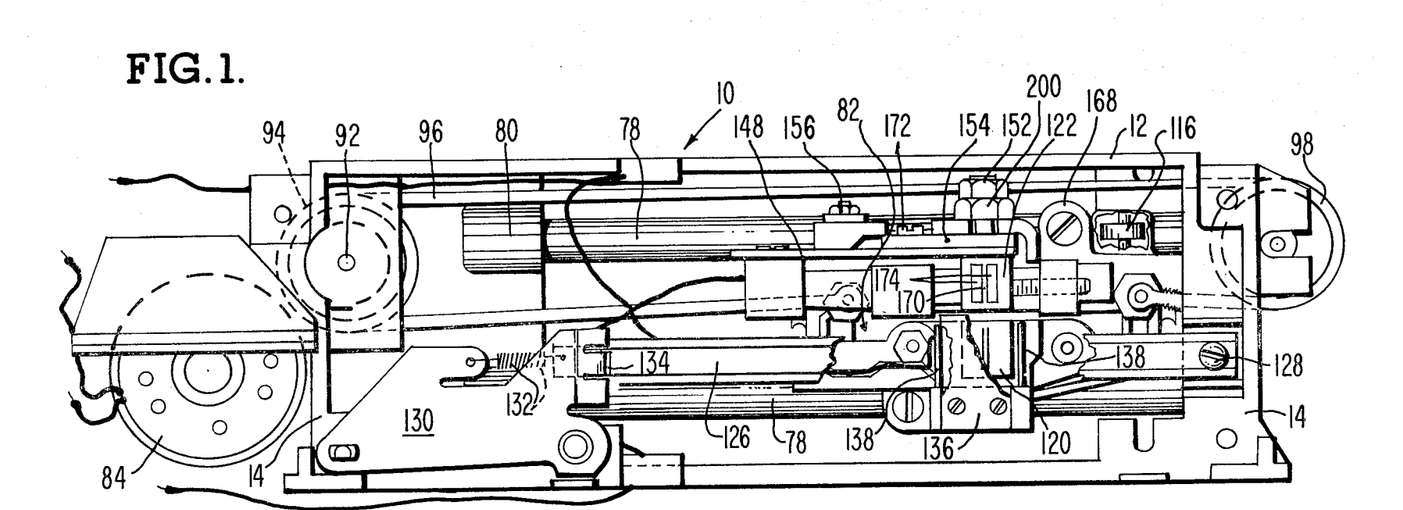
FIG. 1 is a top plan view of an automatic transport assembly in accordance with the present invention.
Figure 2:
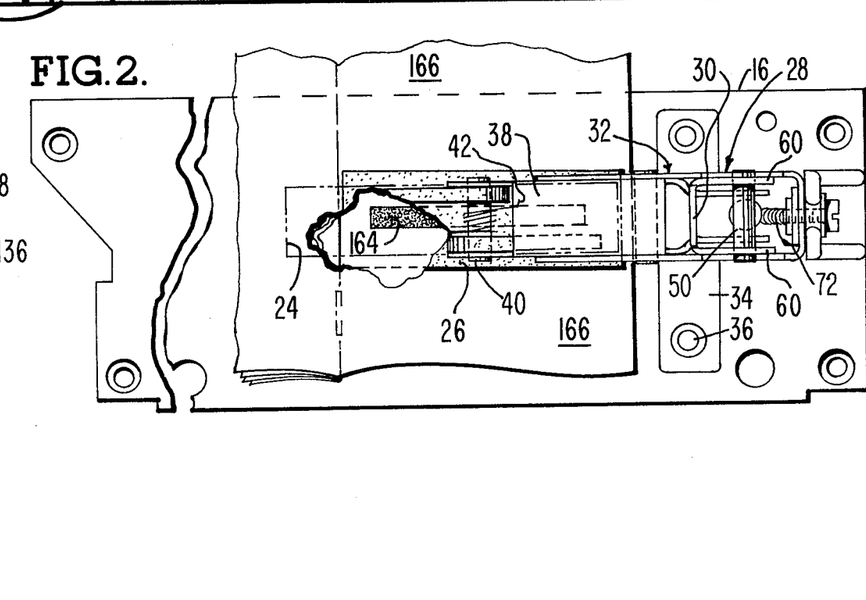
FIG. 2 is a top plan view partially broken away of the top cover member illustrating the platen/anvil and control linkage therefor.
Figure 4:
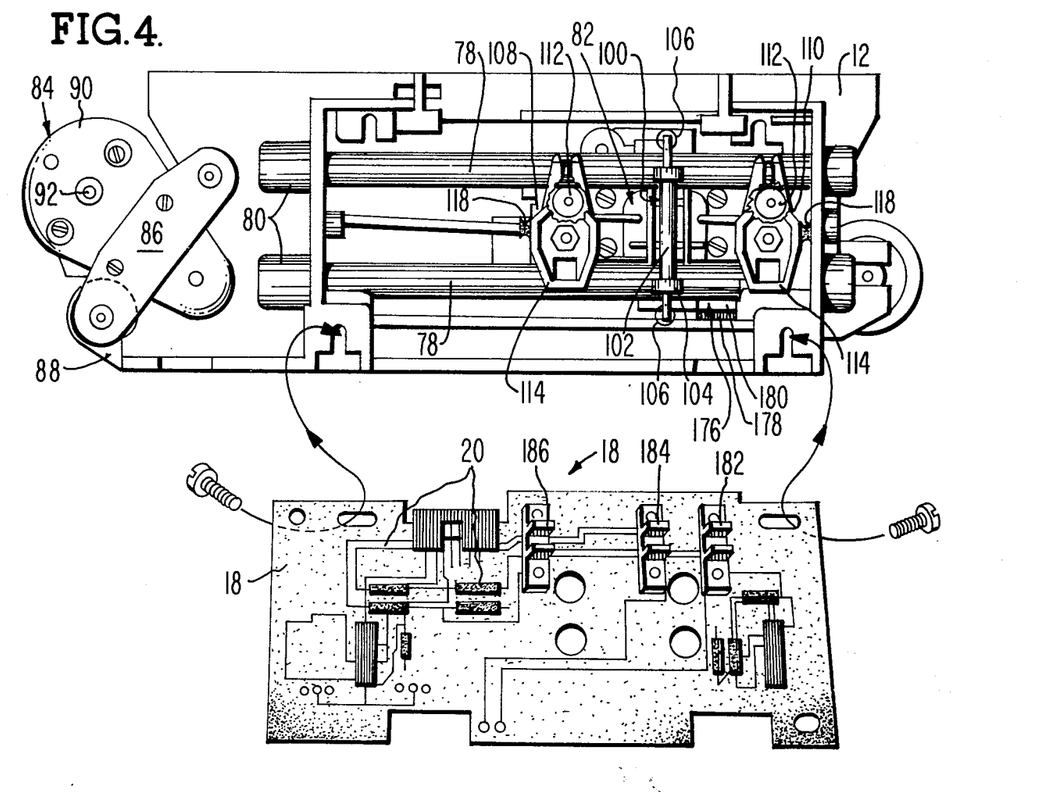
FIG. 4 is a bottom plan view of the automatic transport assembly of FIG. 1, illustrating the bearing and rail guide assembly and the printed wiring panel closure member operably associated therewith.

A magentic transducer read/write transport assembly 10, as seen in FIG. 1 comprises an elongated, integral rectangular, box-like structure 12, molded or cast from a glass filled plastic material, enclosed at opposite ends 14 and provided with a demountable cover member 16, FIG. 2, covering one side opening while the opposite side opening, FIG. 4, is enclosed by a printed wiring panel or board 18 the latter mounting the necessary and required electrical control circuitry 20 for the module, as will be described shortly.

Figure 6:
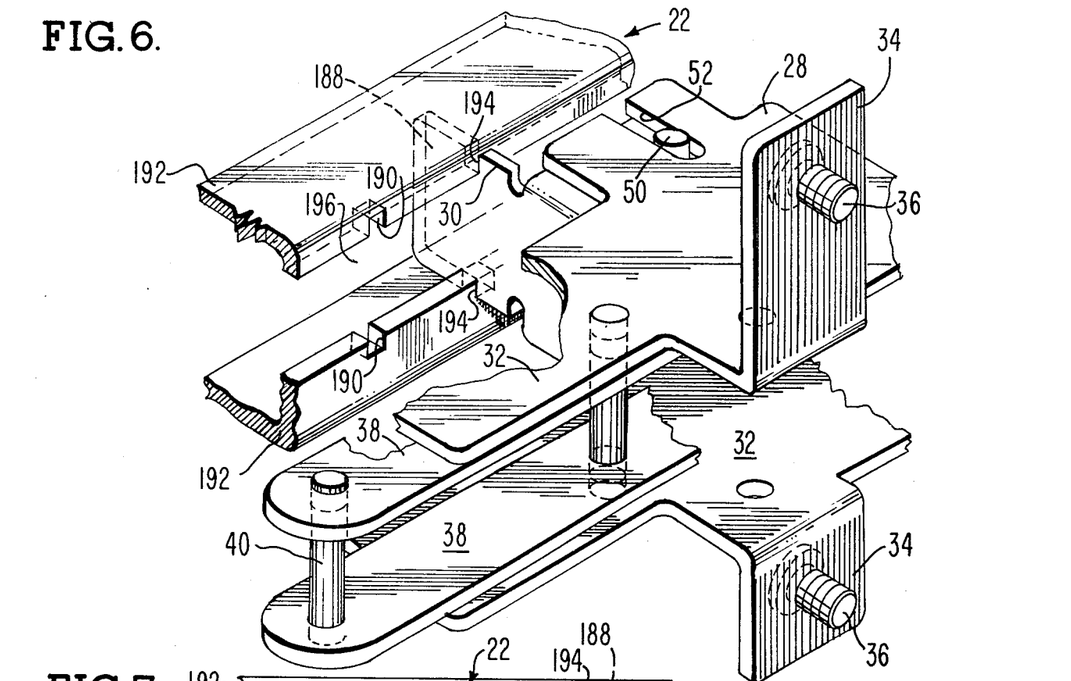
FIG. 6 is a greatly enlarged detail sectional view of the demountable, slidable, coupling linkage between the automatic transport mechanism and the optional base printer apparatus and, FIG. 7 is a side elevational view, not to scale, of the platen/anvil data transducer retractor mechanism of the present invention.

The assembly 10 is fabricated as a modular unitary, demountable structure capable of being interfaced to and demountably engageable with a control unit 22, FIG. 6, when the base assembly (not shown) requires read/write transport capability. As seen in FIG. 2, the cover member 16 is provided with an elongated slot or opening 24 extending across the mid portion thereof for purposes to be described shortly. A movable platen or anvil member 26, carried by a broken link mechanism 28, extends over a major portion of the opening 24 and is movable toward and away therefrom (normal to the opening) actuated by means of a notched link or tang 30 extending vertically, at right angles FIG. 7 to the platen member 26 for operable engagement with the control unit 22.

Figure 7:
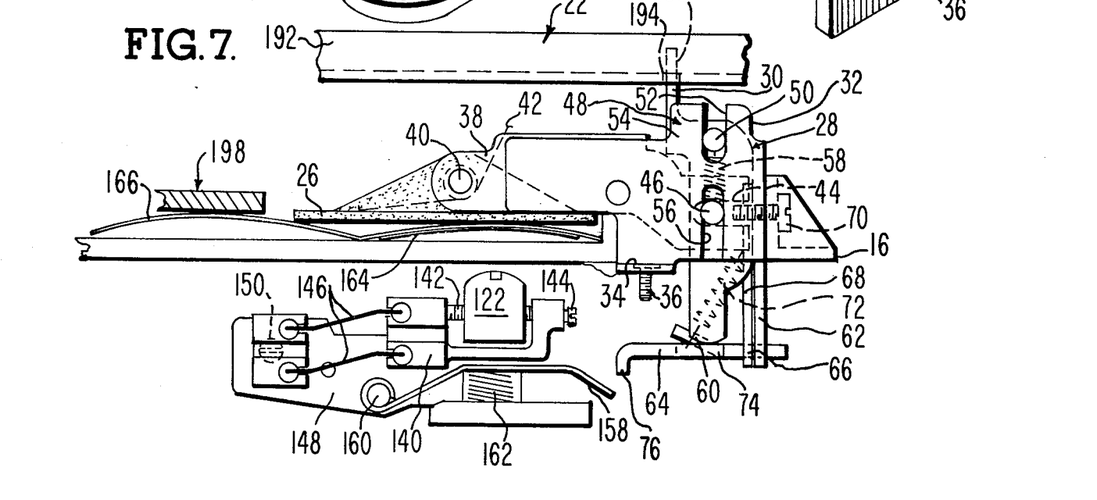

Broken link mechanism 28 FIG. 7 comprises a vertically oriented U-shaped support or frame 32, FIGS. 2 and 7, secured to member 16 by means of the right angle tangs 34 and bolts 36 FIG. 6. A pivot link 38 carries at its forward end (leftward in FIGS. 2 and 7) platen/anvil 26 mounted thereon by means of pivot pin 40. Tension spring 42 urges anvil 26 toward opening 24 in member 16. The opposite end (rightward in FIGS. 2 and 7) is provided with a notch 44 including two rightwardly projecting parallel tangs engageable with a cross pin 46. Notched link 30 is provided with a U-shaped portion 48 carrying a cross pin 50 vertically slidably movable in an upper vertical notch 52 between vertical tangs 54 while cross pin 46 is vertically slidably movable in lower notch 56 in the right lower portion of member 32. The two pins 46 and 50 are adapted for conjoint movement under the urging of coupling spring 58.

The lower extremity of member 30 terminates in a pair of parallel cam projections 60 (FIG. 2 and FIG. 7) for purposes to be described presently. The rightward portion of frame 32 is provided with a depending yoke member 62. A flat horizontally extending cross link 64 has its rightward end pivotally mounted to yoke 62 in member 32 with a fulcrun 66 provided by parallel depending member 68. Member 68 together with bolt 70 FIG. 7 secures member 32 to the cover member 16. A spring 72 biases the oppositely disposed horizontally projecting flat wing portions 74 of cross link 64 into engagement with the parallel cam members 60 of member 30. The leftward end of cross link 64 (FIG. 7) includes a turned down end portion 76 for purposes to be explained presently.

As seen in FIGS. 1 and 4 the molded structure 12 is provided with two, substantially identical, parallel, guide rods or rails 78 extending across the open portion of the structure and received at opposite ends in integrally molded bosses 80. Slidably supported on rails 78 is a magnetic read/write transducer (head) carrier or transport assembly 82, (FIG. 4) molded or cast of similar hardened, glass filled plastic material as the structure supporting the guide rods 78. To drive the transport member 82 back and forth along rails 78 a small electric D.C. motor 84 is utilized. Motor 84 is attached to the member 12 by means of a flat strap 86 secured by bolts between an integrally molded outrigger 88 and an integral pedestal (not shown). Reduction gearing 90 (FIG. 4) couples motor output shaft 92 to a drive pulley 94 (FIG. 1). A drive cable 96 fixed at one end to transport 82 is wrapped around drive pulley 94 and extends across the open area of member 12 and around an idler pulley 98 to be attached at its opposite end then to the opposite end of transport 82.

Integrally molded transport assembly 82 is substantially E-shaped in external configuration, longer than it is wide and adapted to ride above rails 78 as viewed in FIGS. 1 and 4 with the main body portion forming three supporting pylons or pedestals extending between the rails 78, as will now be described.

As seen in the bottom view of FIG. 4, the center pylon or pedestal 100 of carrier transport assembly 82 is molded to form a shallow receptacle at right angles to rails 78 into which a flat sided shaft 102 is slip fitted. Roller bearings 104 at opposite ends of shaft 102 are adapted to contact and ride along rails 78. Spring tiedown members 106 at each end of shaft 102 prevent dislodgement of shaft 102 while still permitting lateral movement along rails 78. This arrangement also makes for ease of fabrication service and/or repair.

Oppositely disposed pedestals 108 and 110 (of the three earlier referred to) as seen in FIG. 4 are each provided with an individual, integral receptacle (not shown) for receiving a snap-in roller bearing 112 engageable with the upper portion of the rear one of the two guide rails 78. A plastic skid member 114 is bolted to the base of each pedestal 108–110 and extends at right angles to and over both rails 78 effectively balancing transport member 82 for movement along rails 78 in a minimal clearance condition.

Figure 4A:
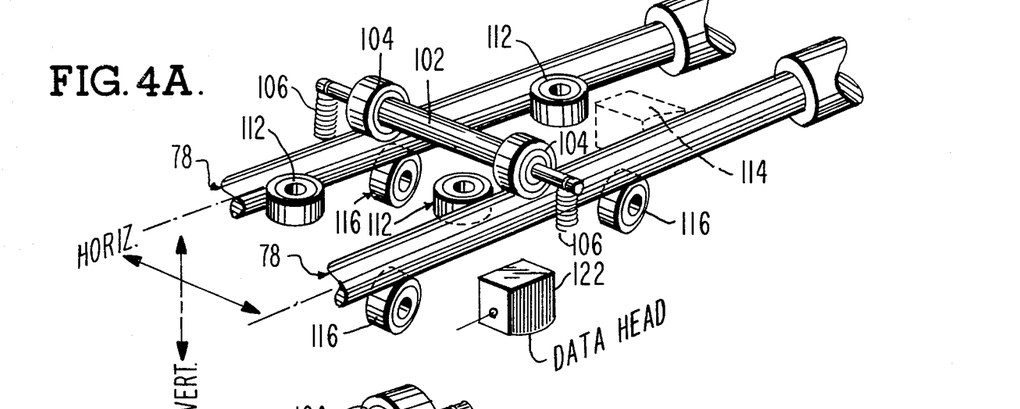
FIG. 4A is a schematic illustration of the wear compensating assembly for the transport.
Figure 4B:
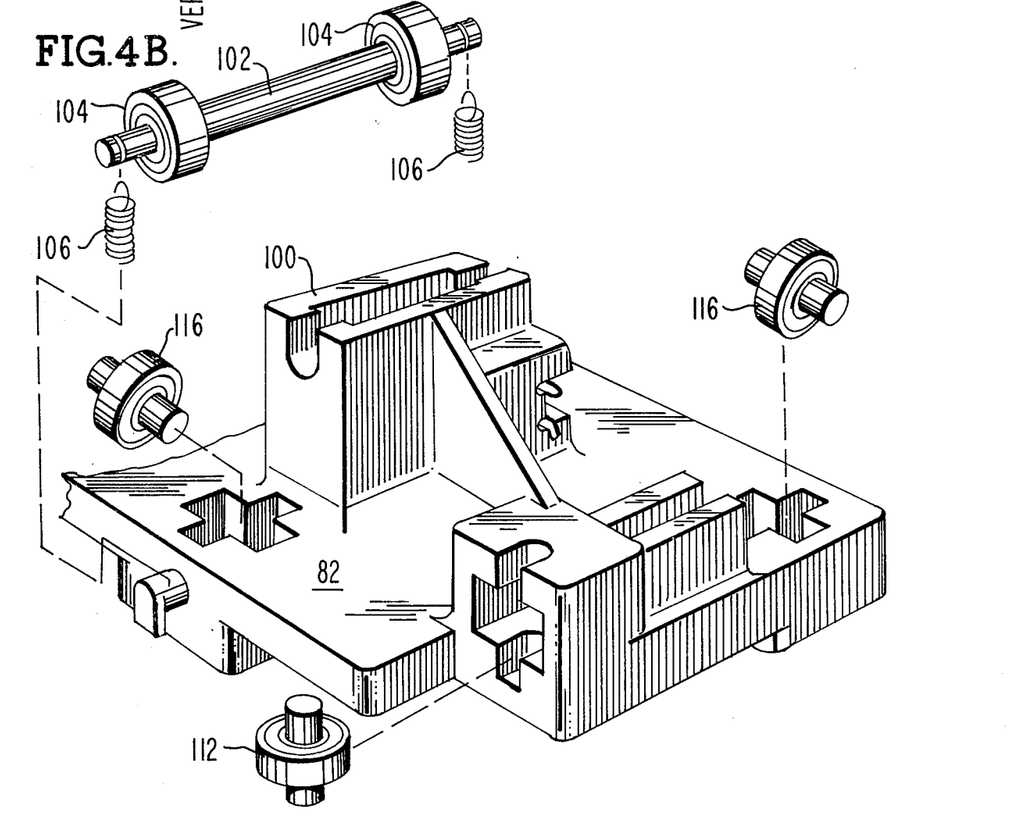
FIG. 4B is a perspective view, not to scale, of the head carrier assembly for the transport.

Each opposite end pylon 108-110 also carries a snap-in roller bearing 116 within a receptacle formed therein and arranged to contact and ride along the inner portion of the front one of the two rails 78 as shown in FIG. 4A.

So as to avoid any shock which might damage either the transducer mechanism or destroy the accuracy of the various planes of reference involved with the transport assembly, oppositely disposed resilient bumpers or shock absorbers 118 are secured to opposite exterior end portions of member 82. Shock absorbers 118 take up the bounce and shock in the event member 82 strikes opposite interior end walls of member 12.

Figure 3:
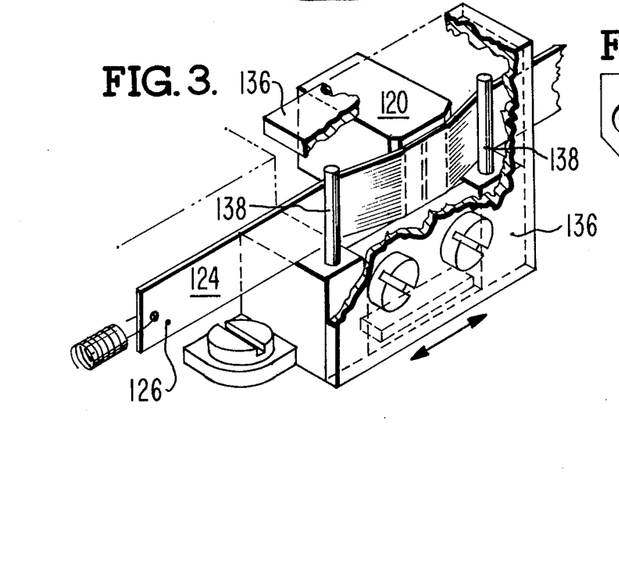
FIG. 3 is a greatly enlarged detail view of the synchronizing timing track and transducer assembly of the present invention.

Referring to FIGS. 1, 3 and 7, and as earlier mentioned, the present invention includes electromagnetic sychronizing track and data track transducers 120 and 122, respectively. The timing track 124 for use with sychronizing-timing track transducer 120 is provided by means of a demountable, replaceable, flexible strip 126 of magnetic oxide coated plastic material. Strip 126 is demountably secured adjacent the transducer 120 by means of a bolt 128 at one end and the irregularly shaped tensioning device 130 at the opposite end. A tension spring 132 biases the strip 126 against the bent over shoe 134 forcing the spring biased end of the strip slightly downwardly as seen in FIG. 1. So as to avoid any strong flux or magnetic interference between the gaps of transducer 120 and transducer 122 an L-shaped mu-metal shield 136, seen most clearly in FIGS. 1 and 3, is secured as by bolts to the frame of transducer transport assembly 82 and overlies the operating gap of the sychronizing track transducer. As seen most clearly in FIG. 3, in order to bring the transducer head 120 into surface contact with the timing track strip 126 the strip is fed beneath two oppositely disposed rod like tensioning members 138 projecting from the base of the transducer head support structure. This arrangement causes the strip 126 to be slightly bowed as it passes over the head but brings the strip into contact with the head thereby avoiding any low level signal problems which would be associated with the transducer were there to be an air gap between the strip and the head.

Figure 5:
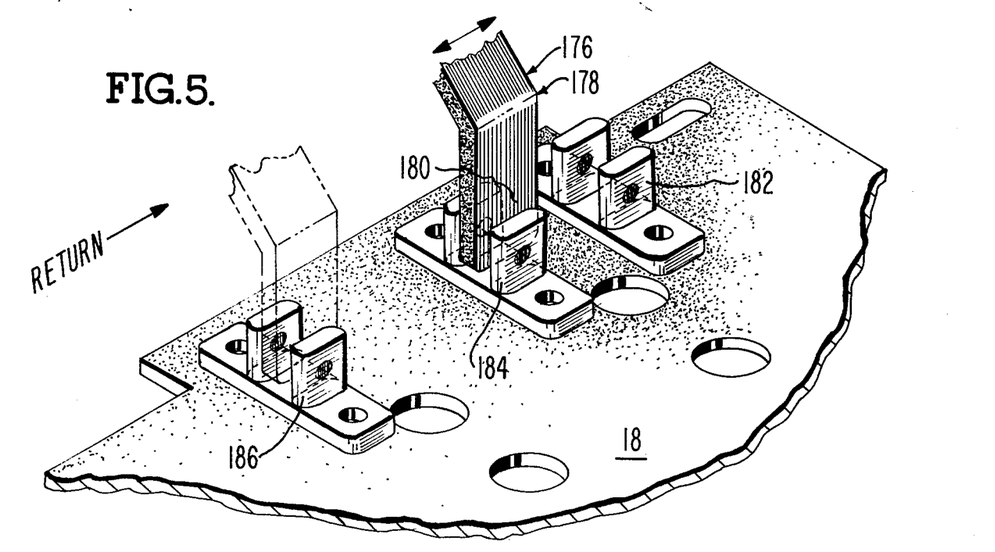
FIG. 5 is a greatly enlarged portion of the printed wiring panel of FIG. 4 illustrating the indicator flag and solid state position status indicators of the present invention.

As earlier noted herein, two electromagnetic transducers are employed with the present invention. Transducer 122 acts as a data read/write head. The second transducer 120 acts as a timing track read/write head. Read/write transducer 122, as seen in FIGS. 1 and 7 is gimble mounted on a U-shaped swing arm 140 by means of the fixed pivot pin 142 on one side of arm 140 and the adjustably threaded pivot pin 144 on its opposite side. A pair of parallel flat flexure spring members 146 extending from swing arm 140 couple the transducer 122 to an adjustable support arm 148 (as by bolt 150) and provide for motion in one plane while pivot pins 142 and 144 provide for motion in a plane at right angles thereto. The entire structure is physically supported on member 82 by means of a horizontally disposed bolt 152 FIG. 1, (extending through the elongated support 148 which is attached to an irregularly shaped skew arm frame member 154 secured by bolt 156) to the transducer transport assembly 82. Disposed beneath head 122 is a head lift retractor blade assembly 158 FIG. 7 pivoted on pin 160 at its leftward end to assembly 148 and biased by spring 162 so as to push head 122 vertically upwardly through opening 24 FIG. 2 into contact with the magnetic stripe 164 on bank passbook 166. At such times, in the rectilinear movement of transducer assembly 82, that member 158 contacts the head 122 the turned down end portion 76, of cross line 64 will be withdrawn from opening 24 by the depression of retractor blade 158 (downwardly FIG. 7) as will be explained more fully hereinafter. In the retracted position the head is considered to be at home or parked (FIG. 5).

The data transducer 122 is provided with four separate adjustments (i.e. two translations and two rotations) which together permit the assembly to be once adjusted and thereafter to require no further service with the possible exception of replacement for wear or circuit interruption. With respect to rotation of the head, two cams are provided as will be described.

Rotation #1

As seen in the top plan view of FIG. 1, cam 168—the skew cam—rotates the head 122 so that the head gap 170 is perpendicular to the direction of translation or movement thereof. This is characterized as the skew adjustment.

Rotation #2

Cam 172—the tangency cam—located on the side of the assembly FIG. 1 tilts the head 122 forward and backward so that the gap 170 comes in contact with the magnetic stripe 164 FIGS. 2 and 7 at the point of tangency between the gap and the stripe.

Translation #1

The first translation adjustments for head 122 is provided by means of the nut 200 (FIG. 1) at the side of the assembly and directly in line with the gap 170. This adjustment elevates or positions the head 122 through the slot 24 of the cover 16 to assure that the head gap 170 has a contact force acting upon the magnetic stripe 164 on passbook 166.

Translation #2

The second translational adjustment slides the head back and forth across the width of the stripe. This adjustment is made by means of a screw and slot configuration from beneath the assembly 82 (not shown).

Since the apparatus employing the present invention is manufactured to be sold and used world wide, it is necessary for such apparatus to conform to certain international standards, particularly with regard to the read/write capability and the placement of magnetic bits on the data and timing tracks.

In accordance with the ISO specification dealing with writing accuracy, for example, the absolute location of the bits on the track must be repeatable within approximately 0.00023" (or about) 5% bit to bit. This refers to the spacing of each adjacent bit. In order to accomplish this the present invention incorporates a demountable, flexible, precision position transducer that is relatively inexpensive to fabricate. It provides position feedback indicating the precise position at which it is desired to record magnetic flux reversals. The position feedback transducer indicates to the host processor that it, the transducer, is at the correct or next location on the media and recording of a bit can then take place.

The flexible stripe 126 is spring loaded as seen in FIGS. 1 and 3 so that it can flex over the pin 138—138 and over the head 120 as the head is moved along the stripe. The stripe is made to be demountable so that it can be easily and simply replaced as the need arises.

The data track transducer 122 head construction is unusual in the single center tapped coil (not shown) as employed to form a unigap head. One half of this coil is utilized for writing purposes while the full coil is utilized for reading purposes. Alumina wear blocks 174 are disposed on opposite sides of the gap 170 so as to prevent or void undue wear of the head gap area due to passage of the transducer over the magnetizable tape on the passbook. In contrast to this the timing track transducer 120, which is nongimbled while employing a single coil, is utilized for reading only and has only a single coil and employs no wear blocks. In this instance, a ferrite head is used with a chrome plated media, that is, the magnetic stripe. The transport movement of the two transducers is controlled by a host data processor (not shown) which specifies the movement, tracks the location of the data and periodically updates this data information as required.

In order to simplify the controls for the transport assembly 82, as seen in the bottom view of FIG. 4, and the schematic view of FIG. 5, an irregularly shaped flat flag member 176 is secured as by a bolt (not shown) to the righthand end, FIG. 4, of the assembly 82 and depends therefrom with the inwardly bent portion 178 terminating in a flat narrow tang 180, FIG. 5. Arranged in spaced relationship along one edge portion of printed wiring board 18 are three phototransistor transducers or switches 182, 184 and 186, the upstanding parallel portions of which house the active photoelectric sensing circuit energizing elements of these members. Members 182, 184 and 186 are designated "home," "position detect" and "end of travel" switches respectively. The "home" switch 182 is activated by the trailing edge of the tang 180 while the "position detect" switch 184 is actuated by the leading edge of tang 180. The "end of travel" switch 186 is activated by the leading edge of tang 180. The switches are all about one quarter of an inch in width and due to the spacing requirements utilization of both edges of the flag or tang 180 provides adequate separation of the switches by the width of the flag.

Transport assembly 82 driven by motor 84 when activated by the host data processor (not shown) is initialized such as to make three excursions or passes right to left as seen in FIG. 5 and return for purposes now to be described. Starting at the "home" location wherein flag 180 is disposed between the switch members 182. The first "pass" is performed so as to pick up and record within host terminal the information contained on the stripe 126. The second "pass" is an excursion wherein the transducer rewrites the message or messages. The third "pass" is a reverify excursion. The message is read after it has been written so as to verify that the content of the message is correct or valid. These three excursions are the minimum number of passes which the apparatus can make. However, if the apparatus is unable to read a message for some reason, (this is determined by means of a host terminal code, a "no read" condition being indicated,) the apparatus will make three more attempts to read before it stops. (Indicating a faulty, incomplete or nonvalid message.)

OPERATIONAL DESCRIPTION

As earlier noted herein the present apparatus is adapted to be utilized with bank passbook printing apparatus or ledger sheet printing apparatus as the case may be wherein it is necessary or required that the data carried by a magnetizable stripe on the passbook or ledger sheet be interrogated electronically or read such that the information/data carried by the stripe can be employed to update the printed as well as magnetic entries on the magnetic stripe. It is therefore, assumed that the subject APR (automatic passbook reader) apparatus is coupled mechanically and electrically to a printing adjunct in such fashion as to permit the data entries relative to the passbook or ledger sheet to be acted upon automatically or if desired manually assuming the base machine is coupled to a keyboard from which data entries can be accomplished.

During assembly the automatic passbook/reader (APR) of the present invention is mechanically coupled to the base machine by means of the notched member 30 (FIG. 6) which is inserted into the control means 22 with the forward end 188 of member 30 passing vertically between the upper and lower notches 190 in member 22. Thereafter the member 28 and, of course, the entire APR transport assembly 28 is horizontally adjusted along the upper and lower rack members 192 by means of notches 194 and member 30. Until a position is reached in which to accommodate the width of the passbook or other documentation being employed with the device.

With the APR apparatus in place, a passbook 166 carrying a magnetizeable stripe 164 is inserted into the form guides (not shown) of the machine and is automatically driven by means not herein referred to into the machine a sufficient distance to present the magnetizeable stripe 164 to the data head 122 of the APR apparatus. Through suitable switching (not shown) the host apparatus is informed that the passbook is in place for interrogation. The APR transport is then actuated to cause the anvil or shoe 26 (FIG. 7) to close over the passbook and magnetic stripe 164 and clamp the passbook in position for reading and/or writing. The transport assembly 82 then makes the aforementioned three excursions back and forth across the stripe 164 of the passbook after which the assembly 82 is parked in its home position FIG. 5, which causes the member 64 to depress the member 158 retracting the head 122 from the stripe 164 and permitting the passbook 166 to be withdrawn from the base printing apparatus.

An important aspect of the present invention is the arrangement illustrated schematically in FIG. 4A of the drawings wherein it is noted that multiple sets of roller bearings are employed to enable motion of the transducer carrier member 82 horizontally back and forth along the rails 78—78. In this connection it is pointed out that bearings 112, of which there are three assemblies, are adapted to control movement of the carrier member along the rack in the horizontal plane. Bearings 116, of which there are three assemblies, are adapted to limit movement of the assembly in the vertical plane. Bearing shaft assembly 102, 104, 104 is biased by springs 106—106 to maintain this three point bearing assembly at zero clearance, permitting motion along the rails in a relatively slop free condition. Finally, skid members 114 of which there are two as seen particularly in FIG. 4 prevent dislodgement of all spring loaded bearing assemblies and thus provide a smooth and easy gliding translational movement along the rails 78—78 of the transducer carrier member 82.

APPENDIX

The closest prior art of which applicants are aware are the following:

U.S. Pat. No. 4,087,680, issued May 2, 1978 to Ronald H. Mack and Donald L. Bumgardner assigned to Burroughs Corporation and entitled Semiautomatic Credit Card Information Handling Apparatus.

U.S. Pat. No. 4,151,564, issued Apr. 24, 1979, to James N. Schreiber and Donald L. Bumgardner assigned to Burroughs Corporation, entitled Modular Semiautomatic Credit Card Reader/Writer Apparatus. While both of these patents deal with apparatus designed to read data from a magnetizable portion of a credit card neither of the patents show, describe, or claim the structural arrangement set forth and claimed in the present application.

We claim:

1. Automatic passbook reader/writer apparatus comprising;
    means mounting a first electromagnetic transducing mechanism for movement adjacent to a passbook receiving throat so that intelligible data carried by a passbook can be retrieved from the passbook and electrically transferred to other associated apparatus for further processing,
    means mounting a second electromagnetic transducing mechanism adjacent to said first transducing mechanism and in close proximity to a timing track for sychronizing the data derived from and applied to said passbook,
    means for moving said transducing mechanisms relative to said passbook and said timing track effective to scan said timing track and the intelligence bearing portion of said passbook for interrogating the intelligible data thereon,
    means mounting and maintaining said passbook in a flat planar condition relative to said first transducing mechanism effective to produce optimum data recording and reading therefrom, and
    means carried by said reader/writer apparatus adapted for demountable engagement with and operably coupled to an associated device effective to bring said first transducing mechanism into operative relation with the intelligence bearing portion of said passbook.

2. The invention in accordance with claim 1 wherein said timing track comprises an elongated, flexible medium including means for demountably replacing the same.

3. The invention in accordance with claim 2 wherein said timing track comprises a flat metalized strip having a wear resistant surface integral therewith.

4. The invention in accordance with claim 1 wherein means is provided for placing said timing track under tension effective to cause the track to conform to the peripheral configuration of the transducing mechanism.

5. An automatic bank account passbook reader/writer transport apparatus comprising,
    a self contained, unitary, demountable, modular assembly having a data read/write transducer and a synchronizing timing track transducer,
    means mounting said transducers for reciprocatory movement relative to an intelligence bearing media,
    a demountable flexible timing track disposed adjacent said timing track transducer,
    means for moving said transducers back and forth adjacent to said timing track and said intelligence bearing media effective to cause said transducers to alter the intelligence carried by said intelligence bearing media, and
    means for coupling said unitary assembly to an operably associated printing apparatus such that information data derived from said intelligence bearing media can be transferred to said printing apparatus for printing upon a record member and recording upon a magnetizable medium carried by said record member, said means mounting said transducers for reciprocatory movement comprising a wear compensating suspension including a shaft supported by bearing means arranged to move in a horizontal plane, and means operably coupled to said bearing means to provide zero clearance regardless of wear.

6. The invention in accordance with claim 5 wherein said means mounting said transducers for reciprocatory movement includes a pair of horizontal guide rails and drive means coupled to said transducer for causing the latter to move back and forth along said guide rails.

7. The invention in accordance with claim 5 wherein said means for coupling said unitary assembly to an operably associated printing apparatus comprises a broken line mechanism, one portion of which is adapted to engage means in a printing apparatus for activating said transducer moving means and another portion of which is operably coupled to means for bringing the intelligence bearing member into contact with said data read/write transducer.

8. The invention in accordance with claim 5 wherein said unitary assembly includes a front and a rear cover member and wherein said front cover member carries the means engaging said printing apparatus and means for bringing said intelligence bearing member into contact with said data transducer and said gear cover member is provided with means for sensing the position of said transducer and for controlling the positioning of the latter.

9. The invention in accordance with claim 8 wherein said data and said synchronizing transducers are supported on a unitary modular member enabling said transducers to be moved conjointly and wherein means is provided for automatically with drawing said transducers from contact with said intelligence bearing media according to the position determined by said position sensing means.

10. The invention as claimed in claim 5, in which:
    said means operably coupled to provide zero clearance includes a spring coupled to each end of said shaft supported by bearing means, each spring providing a mechanical bias against the associated bearing to eliminate slop as the bearing turns and thus provide zero clearance regardless of wear.

11. The invention as claimed in claim 10, including:
    a pair of skid members positioned opposite said means to provide zero clearance,
    said skid members preventing dislodgement of said spring loaded bearing assemblies.

* * * * *

UNITED STATES PATENT AND TRADEMARK OFFICE
CERTIFICATE OF CORRECTION

PATENT NO. : 4,273,997
DATED : June 16, 1981
INVENTOR(S) : Donald L. Bumgardner & James N. Schreiber It is certified that error appears in the above—identified patent and that said Letters Patent is hereby corrected as shown below:

Col. 10, Line 27, patent reads "a broken line mechanism" and should be changed to --a broken link mechanism--.

Signed and Sealed this

Twenty-fifth Day of August 1981

[SEAL]

Attest:

Attesting Officer

GERALD J. MOSSINGHOFF

Commissioner of Patents and Trademarks